(12) United States Patent
Manolakos et al.

(10) Patent No.: US 11,564,244 B2
(45) Date of Patent: Jan. 24, 2023

(54) MULTIPLE LINK COMMUNICATION CONSTRAINT

(71) Applicant: QUALCOMM Incorporated, San Diego, CA (US)

(72) Inventors: Alexandros Manolakos, San Diego, CA (US); Jing Sun, San Diego, CA (US); Xiaoxia Zhang, San Diego, CA (US); Wanshi Chen, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 7 days.

(21) Appl. No.: 16/529,129

(22) Filed: Aug. 1, 2019

(65) Prior Publication Data

US 2020/0053754 A1 Feb. 13, 2020

(30) Foreign Application Priority Data

Aug. 7, 2018 (GR) .............................. 20180100371

(51) Int. Cl.
*H04W 72/12* (2009.01)
*H04W 72/04* (2009.01)
(Continued)

(52) U.S. Cl.
CPC ....... *H04W 72/1273* (2013.01); *H04L 5/0051* (2013.01); *H04L 5/10* (2013.01); *H04W 72/042* (2013.01); *H04W 72/0446* (2013.01)

(58) Field of Classification Search
None
See application file for complete search history.

(56) References Cited

U.S. PATENT DOCUMENTS

2005/0250486 A1* 11/2005 Malm .................. H04B 1/7115
375/E1.032
2010/0260151 A1* 10/2010 Onggosanusi ........ H04W 36/18
370/336

(Continued)

OTHER PUBLICATIONS

Spreadtrum Communications, "Discussion on PRB Bundling Size for NR DL", Jun. 16, 2017, 3GPP Draft; R1-1710360, pp. 1-3.*

(Continued)

*Primary Examiner* — Adnan Baig
(74) *Attorney, Agent, or Firm* — Harrity & Harrity, LLP

(57) ABSTRACT

Various aspects of the present disclosure generally relate to wireless communication. In some aspects, a user equipment may receive, when operating in a multiple link communication system, one or more downlink control information (DCI) messages scheduling one or more downlink communications. The user equipment may determine, based at least in part on the one or more DCI messages, whether a communication constraint is satisfied for the one or more downlink communications. The user equipment may determine a communication configuration for the one or more downlink communications based at least in part on whether the communication constraint is satisfied. The user equipment may receive, in the multiple link communication system, the one or more downlink communications based at least in part on the communication configuration. Numerous other aspects are provided.

30 Claims, 9 Drawing Sheets

(51) Int. Cl.
*H04L 5/00* (2006.01)
*H04L 5/10* (2006.01)

(56) References Cited

U.S. PATENT DOCUMENTS

| | | | |
|---|---|---|---|
| 2013/0343301 A1 | 12/2013 | Geirhofer et al. | |
| 2014/0192734 A1* | 7/2014 | Ng | H04L 5/0035 370/329 |
| 2017/0237535 A1* | 8/2017 | Park | H04W 72/0426 370/329 |
| 2018/0049201 A1* | 2/2018 | Hussain | H04W 72/042 |
| 2019/0053270 A1* | 2/2019 | Akoum | H04W 72/085 |
| 2020/0374084 A1* | 11/2020 | Yuan | H04L 5/0005 |

OTHER PUBLICATIONS

Huawei et al., "Multiple NR-PDCCH for Multiple TRP Transmission", Aug. 20, 2017, 3GPP Draft; R1-1712230, pp. 1-4.*
Huawei et al. "DMRS for NR-DCCH", Aug. 20, 2017, GPP Draft; R1-1713742; 7, pp. 1-6.*
Intel Corporation, "Support of NC-JT in NR", May 14, 2017, 3GPP Draft; R1-1707353, , pp. 1-3.*
Huawei, "DMRS for NR-PDCCH", Aug. 2017, 3GPP Draft; R1-1713742, pp. 1-4.*
Intel Corporation: "Support of NC-JT in NR", 3GPP Draft; R1-1707353 Support of NC-JT in NR, 3rd Generation Partnership Project (3GPP), Mobile Competence Centre, 650, Route Des Lucioles, F-06921 Sophia-Antipolis Cedex, France, vol. RAN WG1, No. Hangzhou; May 15, 2017-May 19, 2017 May 14, 2017, XP051272565, Retrieved from the Internet: URL:http://www.3gpp.org/ftp/Meetings_3GPP_SYNC/RAN1/Docs/ [retrieved on May 14, 2017] section 2, 3 pages.
Partial International Search Report—PCT/US2019/044848—ISA/EPO—dated Nov. 11, 2019.
Huawei et al., "DMRS for NR-PDCCH", 3GPP Draft, 3GPP TSG RAN WG1 Meeting #90, R1-1713742, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051316541, 6 Pages, Retrieved from the Internet: URL: http://www.3gpp.org/ftp/Meetings_3GPP_SYNC/RAN1/Docs/ [retrieved on Aug. 20, 2017], section 2.3.
Huawei et al., "Multiple NR-PDCCH for Multiple TRP Transmission", 3GPP Draft, 3GPP TSG RAN WG1 Meeting #90, R1-1712230, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051315047, 4 Pages, Retrieved from the Inernet URL: http://www.3gpp.org/ftp/Meetings_3GPP_SYNC/RAN1/Docs/ [retrieved on Aug. 20, 2017], Section 2.2.
International Search Report and Written Opinion—PCT/US2019/044848—ISA/EPO—dated Feb. 7, 2020.
Spreadtrum Communications: "Discussion on PRB Bundling Size for NR DL", 3GPP Draft, 3GPP TSG RAN WG1 NR Ad-Hoc #2, R1-1710360, Disucssion on PRB Bundling Size for NR DL-Final, 3rd Generation Partnership Project (3GPP), Mobile Competence Centre, 650, Route Des Lucioles, F-06921 Sophia-Antipolis Cedex, vol. RAN WG1, No. Qingdao, P.R. China, Jun. 27, 2017-Jun. 30, 2017, Jun. 16, 2017 (Jun. 16, 2017), XP051304281, 4 Pages, Retrieved from the Internet: URL:http://www.3gpp.org/ftp/tsg_ran/WG1_RL1/TSGR1_AH/NR_AH_1706/Docs/ [retrieved on-Jun. 16, 2017] p. second-p. third.

* cited by examiner

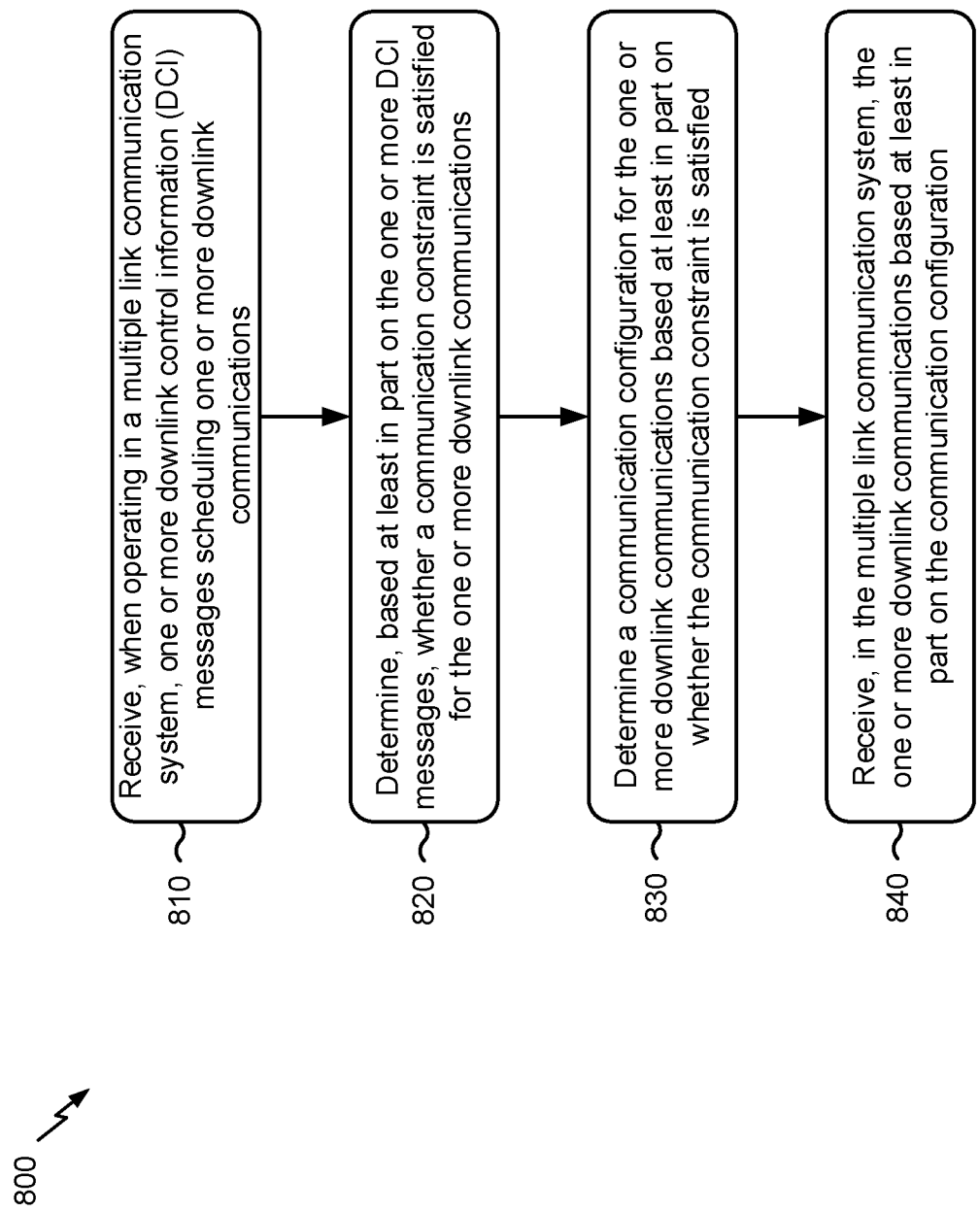

MULTIPLE LINK COMMUNICATION CONSTRAINT

CROSS-REFERENCE TO RELATED APPLICATIONS UNDER 35 U.S.C. § 119

This application claims priority to Greek Patent Application No. 20180100371, filed on Aug. 7, 2018, entitled "MULTIPLE LINK COMMUNICATION CONSTRAINT," which is hereby expressly incorporated by reference herein.

FIELD OF THE DISCLOSURE

Aspects of the present disclosure generally relate to wireless communication, and more particularly to techniques and apparatuses for multiple link communication constraint.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, when operating in a multiple link communication system, one or more downlink control information (DCI) messages scheduling one or more downlink communications. The method may include determining, based at least in part on the one or more DCI messages, whether a communication constraint is satisfied for the one or more downlink communications. The method may include determining a communication configuration for the one or more downlink communications based at least in part on whether the communication constraint is satisfied. The method may include receiving, in the multiple link communication system, the one or more downlink communications based at least in part on the communication configuration.

In some aspects, a user equipment for wireless communication may include memory and one or more processors operatively coupled to the memory. The memory and the one or more processors may be configured to receive, when operating in a multiple link communication system, one or more DCI messages scheduling one or more downlink communications. The memory and the one or more processors may be configured to determine, based at least in part on the one or more DCI messages, whether a communication constraint is satisfied for the one or more downlink communications. The memory and the one or more processors may be configured to determine a communication configuration for the one or more downlink communications based at least in part on whether the communication constraint is satisfied. The memory and the one or more processors may be configured to receive, in the multiple link communication system, the one or more downlink communications based at least in part on the communication configuration.

In some aspects, a non-transitory computer-readable medium may store one or more instructions for wireless communication. The one or more instructions, when executed by one or more processors of a user equipment, may cause the one or more processors to receive, when operating in a multiple link communication system, one or more DCI messages scheduling one or more downlink communications. The one or more instructions, when executed by the one or more processors of the user equipment, may cause the one or more processors to determine, based at least in part on the one or more DCI messages, whether a communication constraint is satisfied for the one or more downlink communications. The one or more instructions, when executed by the one or more processors of the user equipment, may cause the one or more processors to determine a communication configuration for the one or more downlink communications based at least in part on whether the communication constraint is satisfied. The one or more instructions, when executed by the one or more processors of the user equipment, may cause the one or more processors to receive, in the multiple link communication system, the one or more downlink communications based at least in part on the communication configuration.

In some aspects, an apparatus for wireless communication may include means for receiving, when operating in a multiple link communication system, one or more DCI messages scheduling one or more downlink communications. The apparatus may include means for determining, based at least in part on the one or more DCI messages, whether a communication constraint is satisfied for the one or more downlink communications. The apparatus may include means for determining a communication configuration for the one or more downlink communications based at least in part on whether the communication constraint is satisfied. The apparatus may include means for receiving, in the multiple link communication system, the one or more downlink communications based at least in part on the communication configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
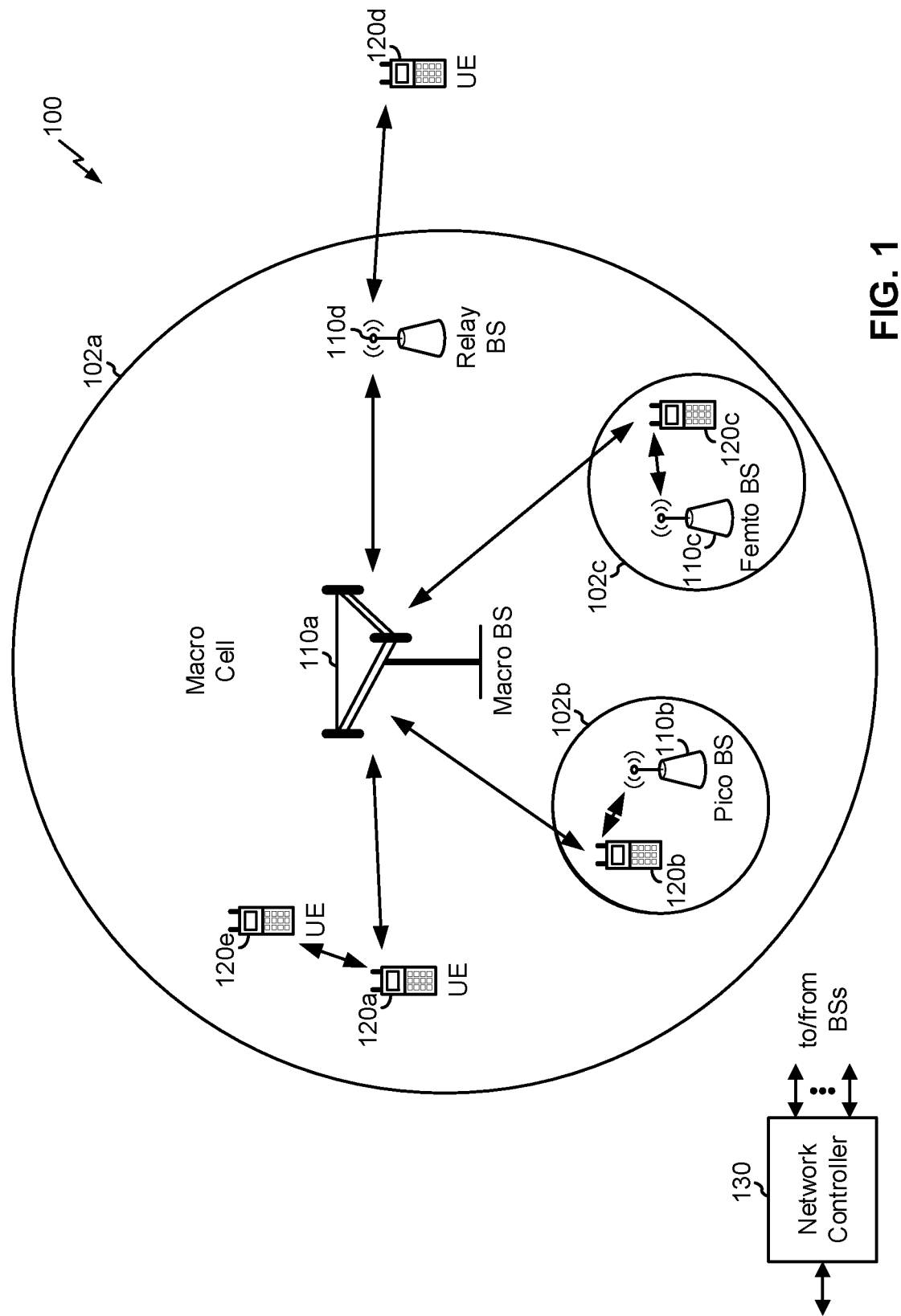
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
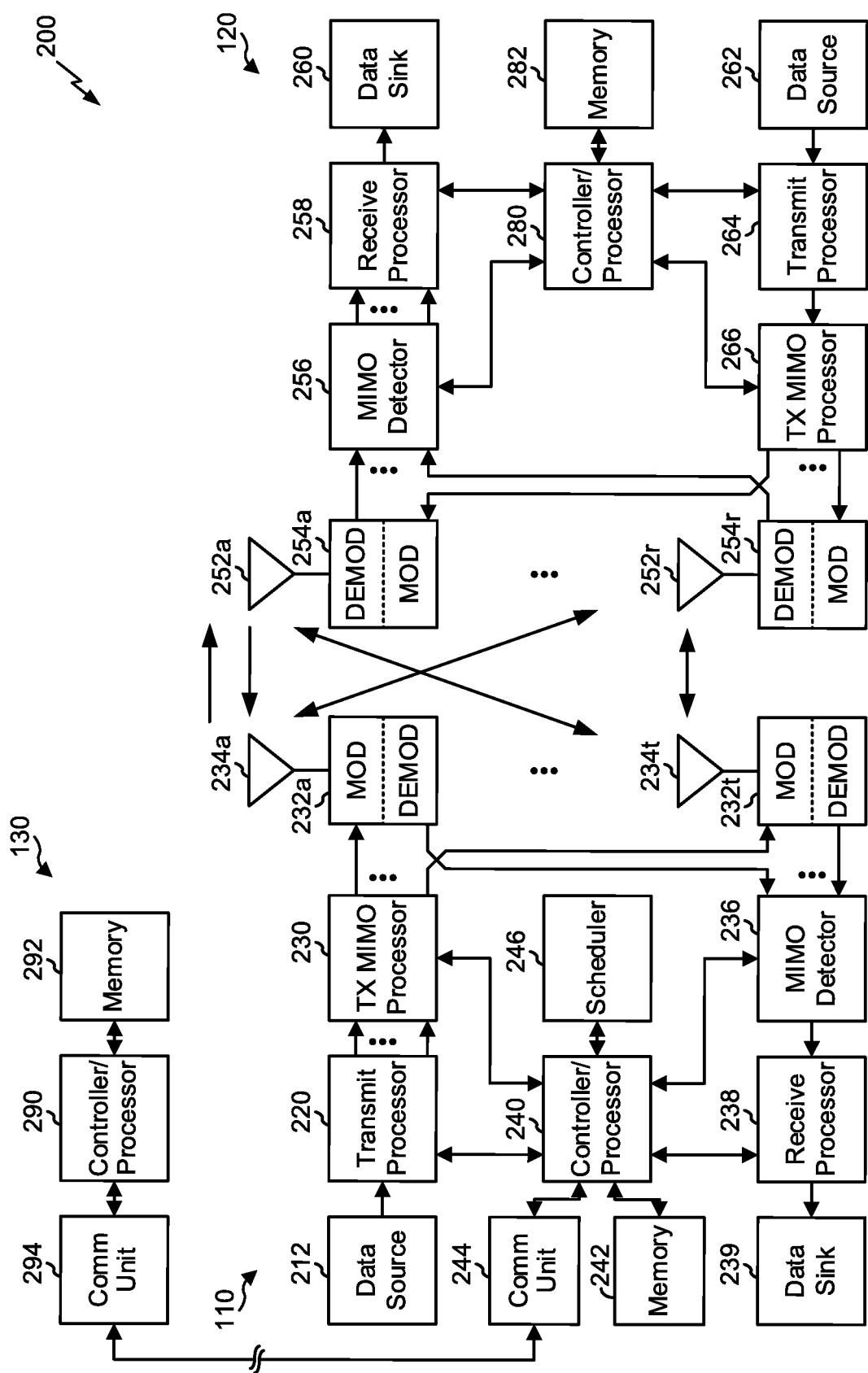
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multiple link communication constraint, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, when operating in a multiple link communication system, one or more downlink control information (DCI) messages scheduling one or more downlink communications; means for determining, based at least in part on the one or more DCI messages, whether a communication constraint is satisfied for the one or more downlink communications; means for determining a communication configuration for the one or more downlink communications based at least in part on whether the communication constraint is satisfied; means for receiving, in the multiple link communication system, the one or more downlink communications based at least in part on the communication configuration; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
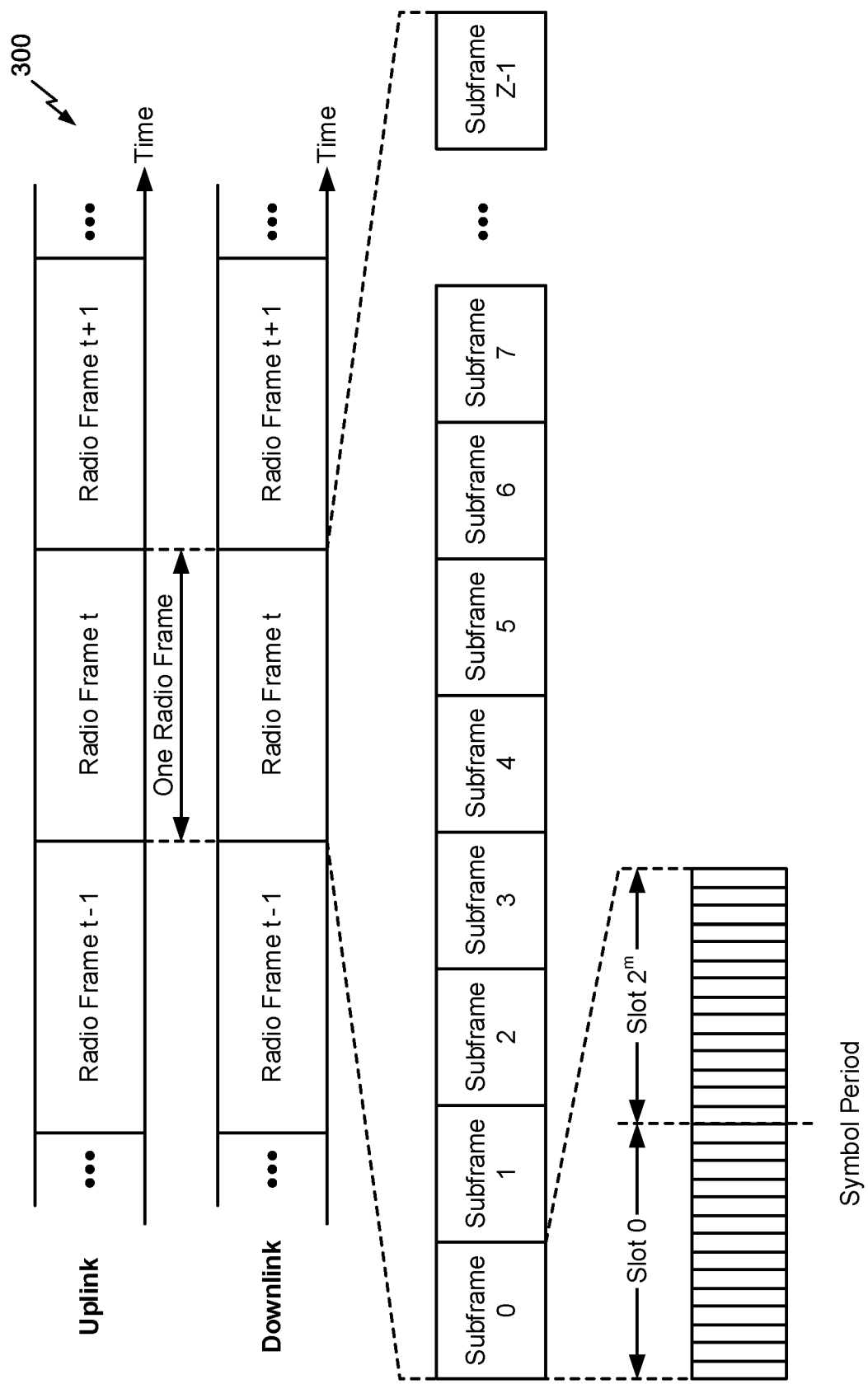
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
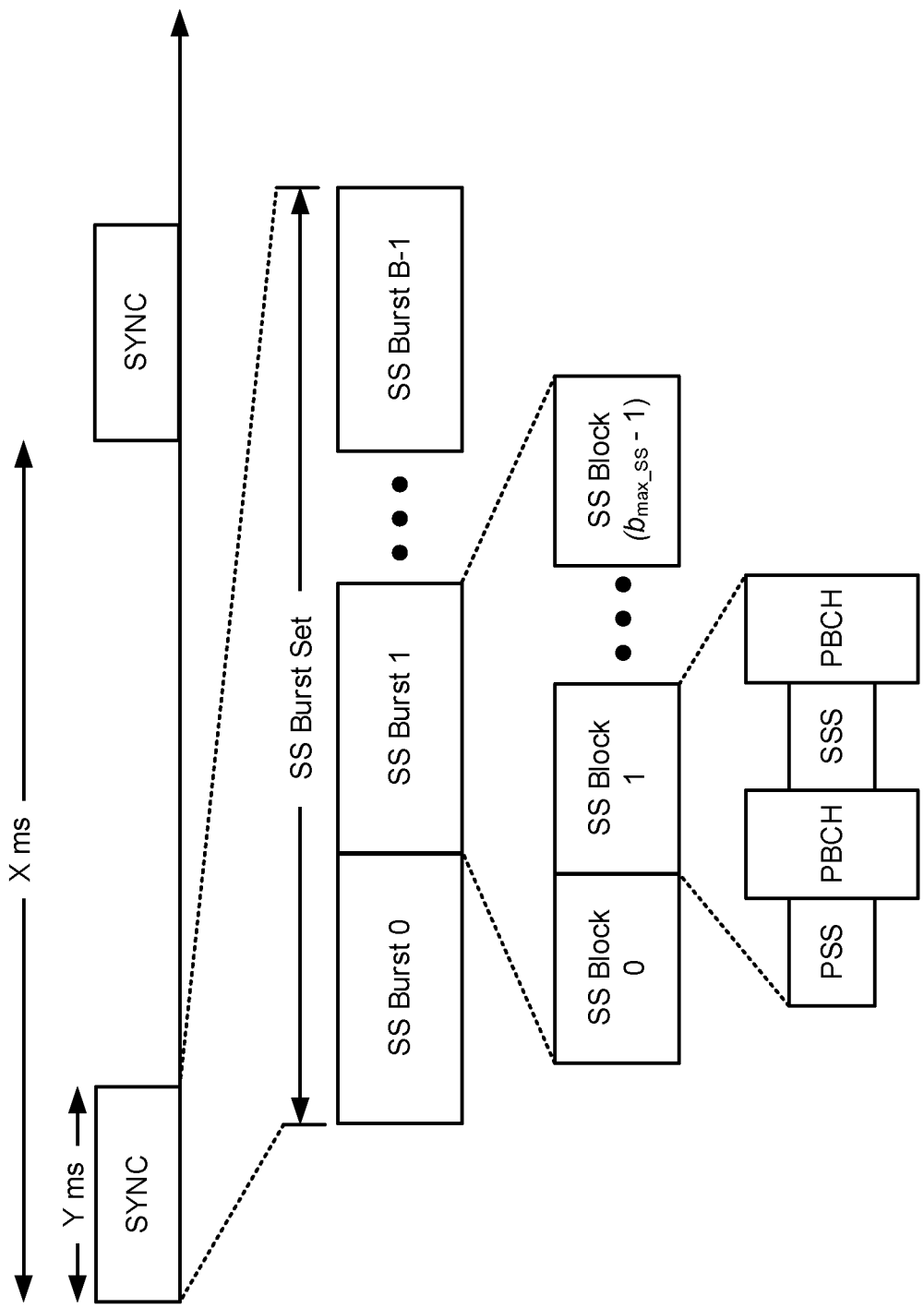
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
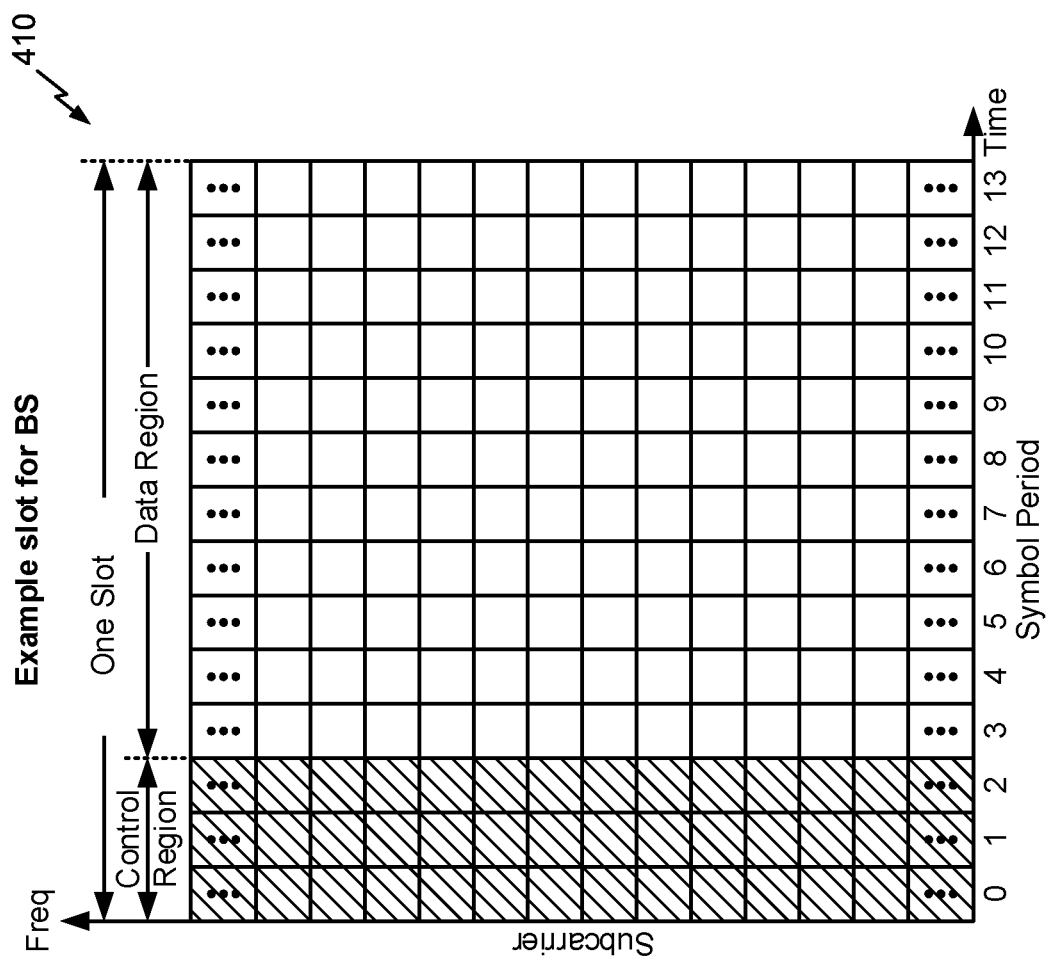
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms.

Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
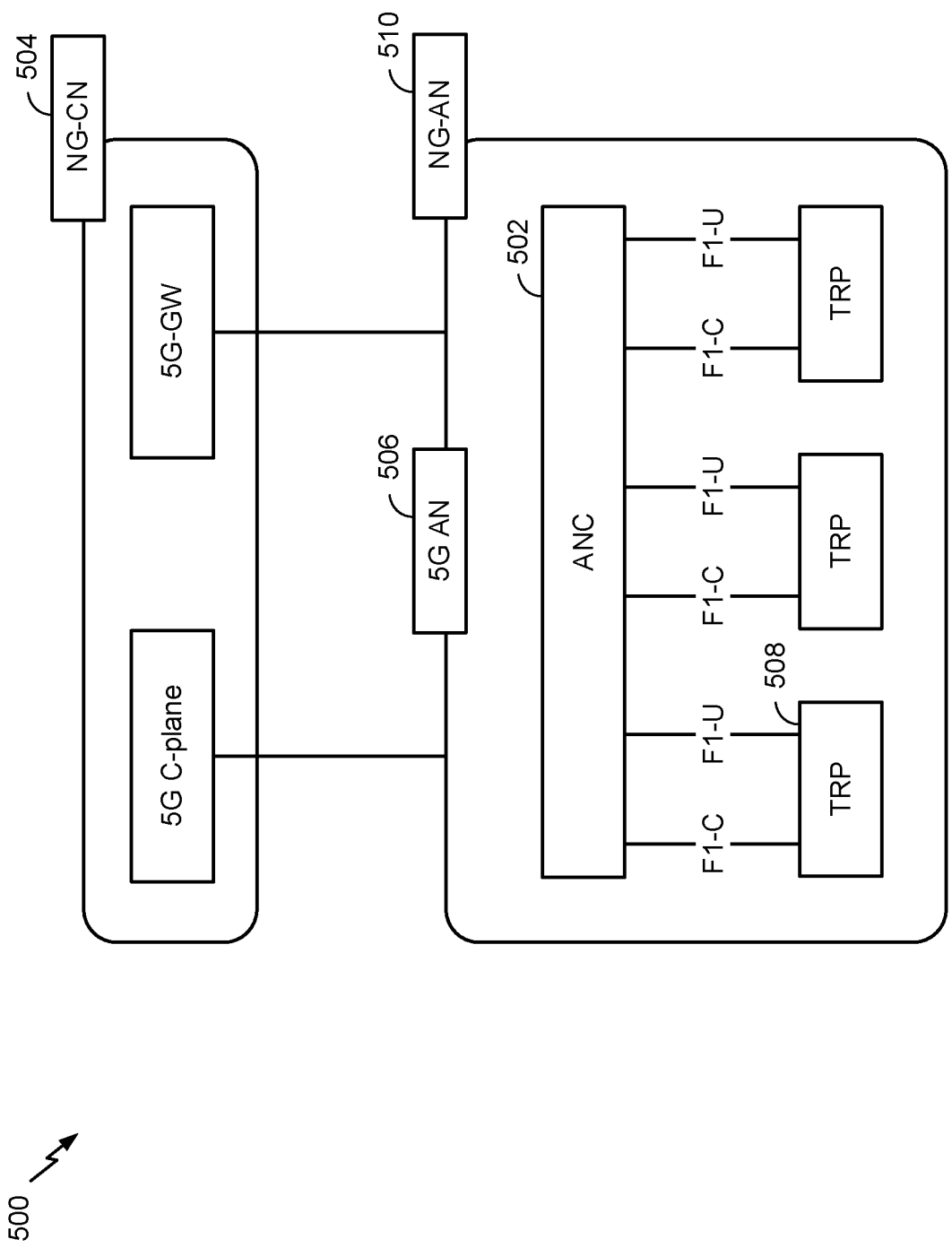
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
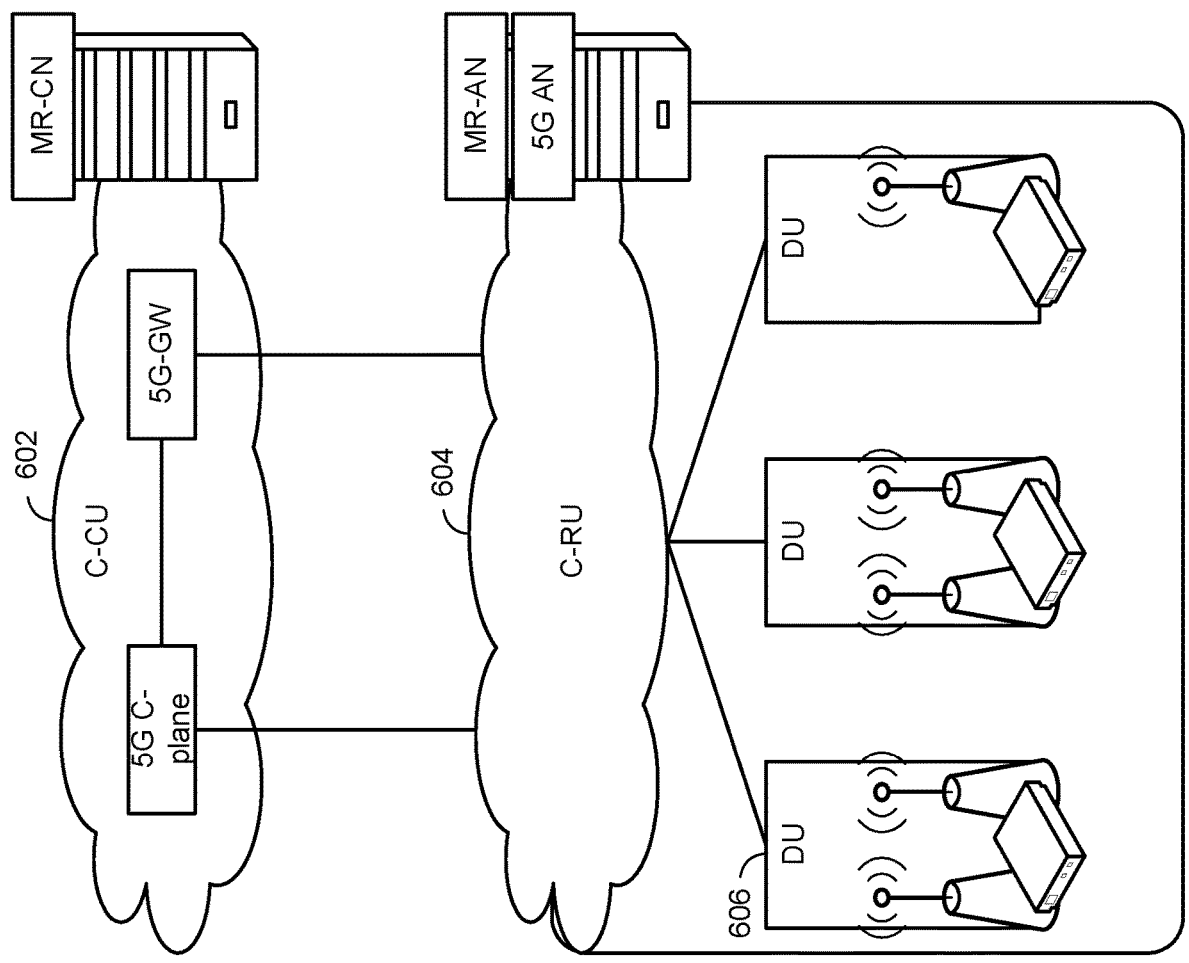
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In some communications systems, such as 5G or NR, a UE may communicate using a plurality of links. For example, in a multi-beam communication system, the UE may communicate with one or more BSs using a plurality of beams. Additionally, or alternatively, in a multiple transmission/reception point (multi-TRP) communication system, the UE may communicate with a plurality of BSs, which may be termed transmission/reception points (TRPs). In this way, the UE may transmit and/or receive a communication with improved reliability, improved throughput, and/or the like relative to a single link communication system. For example, a plurality of TRPs may jointly transmit a physical downlink control channel (PDCCH) communication, a physical downlink shared channel (PDSCH) communication, a reference signal, and/or the like to a single UE.

One or more BSs may provide one or more downlink control information (DCI) messages to schedule one or more communications, such as one or more PDSCHs. For example, the one or more BSs may provide a single DCI message to schedule a plurality of PDSCHs, a plurality of DCI messages to schedule a single PDSCH, a plurality of DCI messages to schedule a plurality of PDSCHs, and/or the like. A DCI message may include information identifying one or more parameters, such as a frequency domain resource assignment parameter, an allocation parameter, a time domain allocation parameter, a virtual resource block (VRB)/physical resource block (PRB) mapping parameter, a PRB bundling parameter, a physical resource group (PRG) parameter, and/or the like.

However, based at least in part on receiving the one or more DCIs, a UE may receive a set of parameters, which may result in excessive UE processing requirements, excessive UE memory utilization requirements, excessive UE power resource utilization requirements, and/or the like. For example, a UE may receive one or more DCIs for one or more PDSCHs that identify a plurality of VRB/PRB parameters, a plurality of resource allocation parameters, and/or the like. In this case, some UEs may not be associated with a UE capability of processing, storing, and/or the like the plurality of parameters, which may result in the UE failing to successfully process the one or more DCIs for the one or more PDSCHs, and failing to successfully receive and process the one or more PDSCHs.

Some aspects described herein provide multiple link communication constraints. For example, a UE may determine a communication configuration based at least in part on whether a communication constraint relating to a UE capability and/or a transmission scenario is satisfied, and may receive one or more communications using the communication configuration. In this way, the UE may reduce a UE complexity, a processing utilization, a memory utilization, an energy resources utilization, and/or the like relative to not enforcing the communication constraint.

Figure 7:
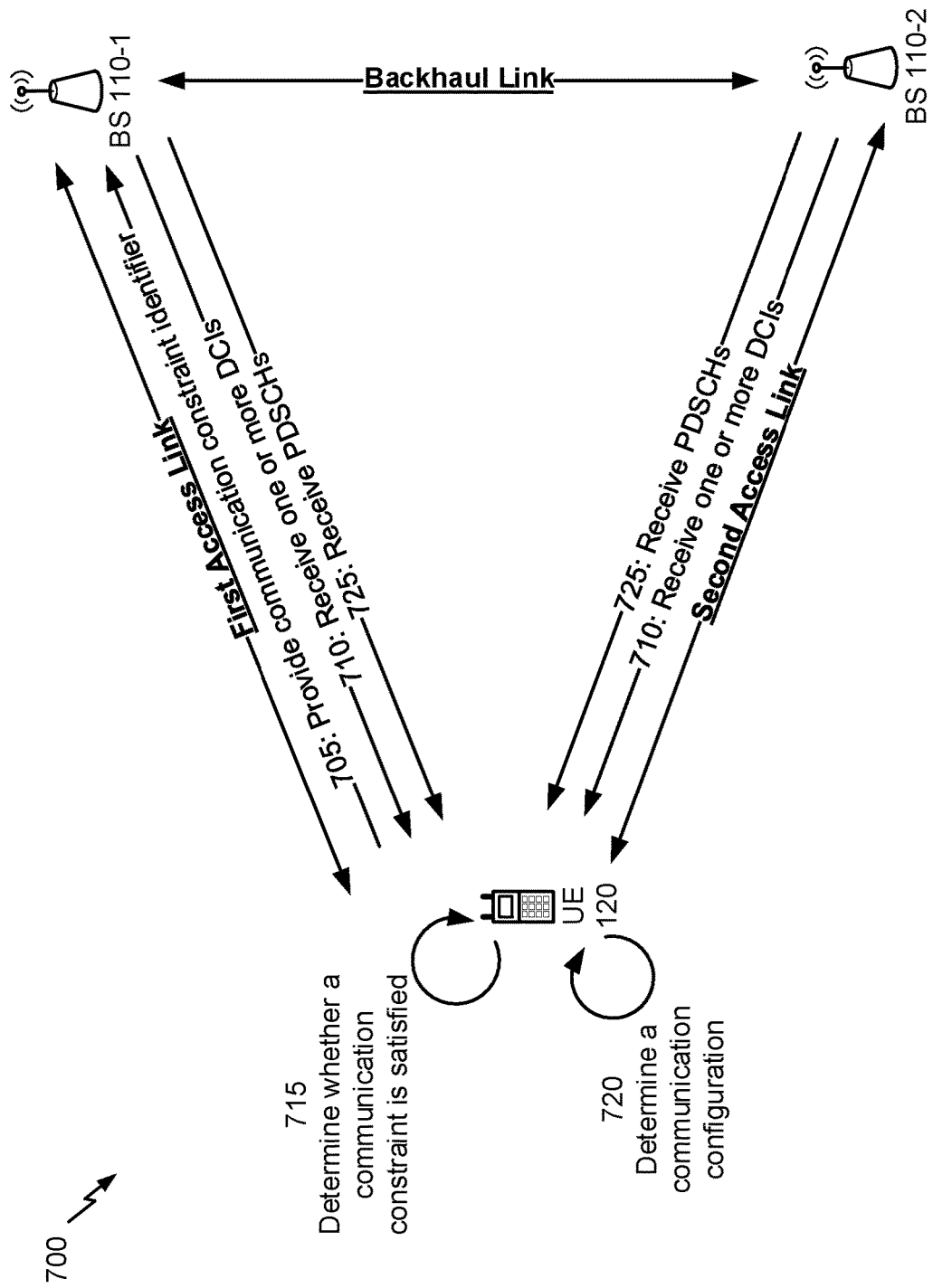
FIG. 7 is a diagram illustrating an example of multiple link communication constraint, in accordance with various aspects of the present disclosure.

FIG. 7 is a diagram illustrating an example 700 of multiple link communication constraint, in accordance with various aspects of the present disclosure. As shown in FIG. 7, example 700 includes a first BS 110-1 communicating with a second BS 110-2 via a backhaul link, and a UE 120 communicating with first BS 110-1 and second BS 110-2 via a first access link and a second access link, respectively.

As further shown in FIG. 7, and by reference number 705, UE 120 may provide a communication constraint identifier. For example, UE 120 may transmit a message to first BS 110-1, to second BS 110-2, to first BS 110-1 and second BS 110-2, and/or the like, identifying a set of communication constraints for limiting scheduling of a downlink channel communication, such as a PDSCH, to reduce a utilization of processing resources, memory resources, energy resources, and/or the like by UE 120. Additionally, or alternatively, UE 120 may identify a set of communication constraints relating to a PDCCH, a reference signal, and/or the like.

In some aspects, UE 120 may determine the set of communication constraints to provide to, for example, first BS 110-1 based at least in part on a UE capability of UE 120. For example, UE 120 may determine that a particular communication constraint is to be enforced by first BS 110-1 based at least in part on a type of UE of UE 120, a processing capability of UE 120, a timing characteristic of UE 120 relating to switching between frequency resources, and/or the like. In this case, UE 120 may provide the communication constraint identifier to identify the particular communication constraint. In some aspects, UE 120 may provide information identifying a scenario in which the particular communication constraint is to be enforced, as described in more detail below. For example, UE 120 may determine that a particular communication constraint is applicable in a particular scenario, such as a communication constraint relating to using a common VRB/PRB mapping value for each PDSCH being applicable when each PDSCH is associated with a common component carrier or a common bandwidth part. In this case, UE 120 may provide information identifying the particular scenario to cause, for example, first BS 110-1 to provide one or more DCI messages scheduling a plurality of PDSCHs that use the common VRB/PRB mapping value when the plurality of PDSCHs are scheduled for the common component carrier or the common bandwidth part.

In some aspects, UE 120 may determine a communication constraint based at least in part on a parameter associated with an operating condition of UE 120. For example, UE 120 may determine that UE 120 is associated with a particular carrier aggregation mode, and may transmit the communication constraint identifier to first BS 110-1 to indicate that a particular communication constraint is to be enforced while UE 120 operates in the particular carrier aggregation mode. In some aspects, UE 120 may determine the communication constraint based at least in part on a configuration of UE 120. For example, when UE 120 is configured for joint processing of demodulation reference signals (DMRSs), soft combining of log likelihood ratios (LLRs), and/or the like, UE 120 may indicate a particular set of communication constraints, and may indicate a different set of communication constraints when UE 120 is not configured for joint processing or soft combining. Similarly, UE 120 may set a communication constraint that UE 120 is to receive PDSCHs that include a common transport block (TB). Additionally, or alternatively, UE 120 may determine the particular set of communication constraints based at least in part on whether a plurality of PDSCHs, which are to be scheduled by one or more DCI messages, are configured for DMRS bundling. In some aspects, UE 120 may determine different communication constraints depending on a quantity of PDCCHs or PDSCHs that UE 120 is to receive or a quantity of quasi-co-location (QCL) assumptions associated with the PDCCHs or PDSCHs. For example, if there are only 2 PDSCHs scheduled, UE 120 may determine not to apply a communication constraint, but if there are 4 PDSCHs, UE 120 may apply a communication constraint. In some aspects, UE 120 may determine a communication constraint for a DMRS pattern. For example, when time domain allocations are fully overlapped or completely disjoint, UE 120 may use a common DMRS pattern (e.g., symbol location, quantity of front-loaded DMRSs, and/or the like) for each PDSCH.

In some aspects, UE 120 may determine a communication constraint based at least in part on information relating to a downlink channel communication that UE 120 is to receive. For example, when UE 120 is scheduled for 2 PDSCHs, UE 120 may not indicate a communication constraint, but when UE 120 is scheduled for 4 PDSCHs, UE 120 may indicate a communication constraint to reduce a scheduling complexity relating to the 4 PDSCHs. In some aspects, UE 120 may determine a communication constraint based at least in part on a quantity of layers that UE 120 is scheduled at in each slot or symbol. For example, UE 120 may determine, based at least in part on the quantity of layers, that a particular spacing between the layers is to be enforced for UE 120.

In some aspects, a BS, such as first BS 110-1, may determine one or more communication constraints for UE 120 without receiving a communication constraint indicator. For example, first BS 110-1 may store information indicating that a first scenario is to be associated with a first set of communication constraints and a second scenario is to be associated with a second set of communication constraints. In this case, first BS 110-1 may determine that the first set of communication constraints are applicable in the first scenario, and may determine to enforce the first set of constraints in one or more DCI messages scheduling one or more PDSCHs for the first scenario.

In some aspects, BSs 110 may exchange one or more messages associated with indicating communication constraints. For example, based at least in part on first BS 110-1 receiving the communication constraint indicator, first BS 110-1 may provide the communication constraint indicator to second BS 110-2 via the backhaul link. Additionally, or alternatively, first BS 110-1 may provide scheduling information associated with causing second BS 110-2 to schedule a downlink channel in accordance with the communication constraints. For example, first BS 110-1 may indicate that second BS 110-2 is to use a particular parameter for scheduling a downlink channel, thereby satisfying a communication constraint applicable to a scenario associated with the downlink channel.

As further shown in FIG. 7, and by reference numbers 710, UE 120 may receive one or more DCI messages from one or more BSs 110. For example, UE 120 may receive a first set of DCI messages from first BS 110-1, a second set of DCI messages from second BS 110-2, and/or the like. In some aspects, UE 120 may receive a single DCI message. For example, UE 120 may receive a single DCI message associated with scheduling a single PDSCH associated with one or more quasi-co-location (QCL) parameters. Additionally, or alternatively, UE 120 may receive a single DCI message associated with scheduling a plurality of PDSCHs.

In this case, each PDSCH, of the plurality of PDSCHs, may be associated with a particular QCL parameter.

In some aspects, UE 120 may receive a plurality of DCI messages. For example, UE 120 may receive a plurality of DCI messages associated with scheduling a single PDSCH. In this case, UE 120 may receive a first DCI message from first BS 110-1 to schedule the single PDSCH and a second DCI message from second BS 110-2 to schedule the single PDSCH, and the single PDSCH may be associated with one or more QCL parameters. Additionally, or alternatively, UE 120 may receive a plurality of DCI messages associated with scheduling a plurality of PDSCHs. For example, UE 120 may receive a first DCI message from first BS 110-1 scheduling a first PDSCH with a first QCL parameter, and may receive a second DCI message from second BS 110-2 scheduling a second PDSCH with a second QCL parameter.

In some aspects, UE 120 may receive the plurality of DCI messages using a particular network resource. For example, UE 120 may receive the plurality of DCI messages using a common bandwidth part, a common component carrier, and/or the like. Additionally, or alternatively, UE 120 may receive a first subset of the plurality of DCI messages via a first bandwidth part or a first component carrier, and may receive a second subset of the plurality of DCI messages via a second bandwidth part or a second component carrier.

In some aspects, UE 120 may identify a particular set of parameters associated with the one or more DCI messages. For example, UE 120 may determine a VRB/PRB mapping parameter, a resource allocation type parameter, a time domain allocation parameter, a PRG value parameter, and/or the like. Additionally, or alternatively, UE 120 may determine a DMRS pattern parameter, a frequency domain resource assignment parameter, and/or the like.

As further shown in FIG. 7, and by reference number 715, UE 120 may determine whether a communication constraint is satisfied for the one or more PDSCHs scheduled by the one or more DCI messages. For example, UE 120 may determine a scenario associated with the one or more PDSCHs (e.g., that a plurality of PDSCHs are scheduled by the one or more DCI messages), and may determine whether a corresponding communication constraint (e.g., that the plurality of PDSCHs are to be associated with a common VRB/PRB mapping value) is satisfied by the one or more DCI messages (e.g., that the one or more DCI messages indicate a common VRB/PRB mapping value).

In some aspects, UE 120 may determine whether an allocation type communication constraint is applicable (e.g., a scenario for the allocation type communication constraint is applicable) and satisfied. For example, UE 120 may determine whether each allocation, identified by the one or more DCI messages, for the one or more PDSCHs are of a same type. In this case, UE 120 may determine that the allocation type communication constraint is satisfied based at least in part on each allocation being a type 0 allocation, each allocation being a type 1 allocation, and/or the like. In some aspects, when a plurality of PDSCHs are non-overlapping in frequency resources and/or time resources, UE 120 may determine that the allocation type communication constraint is not applicable.

In some aspects, UE 120 may determine whether a component carrier communication constraint is satisfied. For example, UE 120 may determine whether a set of allocations associated with a common component carrier are associated with a common PRG grid. In this case, based at least in part on the set of allocations being associated with the common PRG grid, UE 120 may determine that the component carrier communication constraint is satisfied.

In some aspects, UE 120 may determine whether a PRG communication constraint is satisfied. For example, when UE 120 supports dynamic PRG and UE 120 receives a single DCI message including an indicator of a PRG bit, UE 120 may determine whether a single PRG is configured for a PDSCH scheduled by the single DCI message. In this case, based at least in part on a single PRG being configured for the PDSCH, UE 120 may determine that the PRG communication constraint is satisfied. Additionally, or alternatively, when UE 120 supports dynamic PRG and UE 120 receives a plurality of DCI messages that include PRG bits, UE 120 may determine whether each of the plurality of DCI messages indicates a common PRG grid for PDSCHs scheduled by the plurality of DCI messages. In this case, based at least in part on each of the plurality of DCI messages indicating the common PRG grid, UE 120 may determine that the PRG communication constraint is satisfied. In some aspects, when a first PDSCH and a second PDSCH are fully disjoint or fully overlapping in frequency or time (e.g., using different component carriers or bandwidth parts), UE 120 may determine the PRG communication constraint is not applicable.

In some aspects, UE 120 may determine whether a DMRS communication constraint is satisfied. For example, when UE 120 does not support dynamic PRG, and UE 120 is scheduled for a plurality of PDSCHs, UE 120 may determine whether a common PRG is indicated for use for DMRS CEs of the plurality of PDSCHs. In this case, when the common PRG is indicated, UE 120 may determine that the DMRS communication constraint is satisfied. In some aspects, UE 120 may determine, based at least in part on determining that frequency domain or time domain assignments for the PDSCHs are disjoint, that the DMRS communication constraint is not applicable. Similarly, when UE 120 determines that a plurality of PDSCHs are scheduled for a plurality of different component carriers or bandwidth parts of a common component carrier, UE 120 may determine that the DMRS communication constraint is not applicable.

In some aspects, UE 120 may determine whether a VRB/PRB mapping communication constraint is satisfied. For example, UE 120 may determine that a single VRB/PRB mapping value is used for each DCI message scheduling each PDSCH, and may determine that the VRB/PRB communication constraint is satisfied. In some aspects, when UE 120 determines that a single DCI message schedules a plurality of PDSCHs across a plurality of component carriers or bandwidth parts, UE 120 may determine that the VRB/PRB mapping communication constraint is not applicable.

In some aspects, UE 120 may determine whether a time domain allocation communication constraint is satisfied. For example, UE 120 may determine that a plurality of PDSCHs scheduled by the one or more DCI messages are fully overlapping or fully disjoint (i.e., not partially overlapping), and may determine that the time domain allocation communication constraint is satisfied.

A plurality of different constraints have been described above. In practice, any single constraint or any combination of constraints may be used in a particular scenario.

As further shown in FIG. 7, and by reference number 720, UE 120 may determine a communication configuration based at least in part on whether a communication constraint is satisfied. For example, based at least in part on determining that one or more applicable communication constraints are satisfied, UE 120 may determine to communicate in accordance with the one or more communication constraints. In this way, UE 120 determines a communication configuration associated with a reduced processing utilization, a reduced memory utilization, a reduced energy resource utilization, and/or the like relative to not enforcing the communication constraint.

In some aspects, UE 120 may determine to use a particular stored parameter rather than an indicated parameter based at least in part on determining that an applicable communication constraint (e.g., the DMRS processing communication constraint) is not satisfied. For example, UE 120 may determine to use an RRC configured PRG of a particular PDSCH associated with a particular BS (e.g., first BS 110-1) rather than other PRGs associated with other PDSCHs. Similarly, UE 120 may determine to use a stored value for the PRG rather than a plurality of indicated PRGs of the one or more DCI messages. Similarly, UE 120 may determine to use a smallest PRG value indicated in the one or more DCI messages rather than one or more other PRG values indicated in the one or more DCI messages. In this way, UE 120 may determine to satisfy the communication constraint (e.g., to use a single common PRG for DMRS CEs of a plurality of PDSCHs) that is not enforced by first BS 110-1, second BS 110-2, and/or the like.

Additionally, or alternatively, based at least in part on determining that an applicable communication constraint is not satisfied, UE 120 may determine a communication configuration associated with dropping one or more downlink channels. For example, UE 120 may determine, based at least in part on stored information identifying a response to the applicable communication constraint not being satisfied and when a plurality of PDSCHs are scheduled by the one or more DCI messages, to decode a subset of the plurality of PDSCHs. Additionally, or alternatively, UE 120 may determine to demodulate a subset of the plurality of PDSCHs. In this way, UE 120 may conserve processing resources, memory resources, energy resources, and/or the like relative to processing and/or decoding all of the plurality of PDSCHs.

Additionally, or alternatively, UE 120 may determine to process all of the plurality of PDSCHs, but may determine to process the plurality of PDSCHs using a particular PRG (e.g., that is different from a plurality of indicated PRGs of the one or more DCI messages). Additionally, or alternatively, when the downlink channel includes a plurality of PDCCHs, UE 120 may determine to process all of the PDCCHs using a communication configuration associated with a single PDCCH of the plurality of PDCCHs (e.g., that is different from communication configurations associated with other PDCCHs of the plurality of PDCCHs). In this way, UE 120 reduces a processing utilization, a memory utilization, an energy resource utilization, and/or the like relative to determining a communication configuration in accordance with the one or more DCI messages.

As further shown in FIG. 7, and by reference numbers 725, UE 120 may receive a downlink channel, such as a PDSCH, in accordance with the communication configuration. Additionally, or alternatively, UE 120 may receive a PDCCH, a reference signal, and/or the like. For example, UE 120 may receive one or more downlink channels in accordance with the communication configuration (e.g., in accordance with the communication constraint, in accordance with a configured response to the communication constraint not being satisfied, such as dropping one or more downlink channels, using a stored value for a parameter, and/or the like).

In some aspects, based at least in part on an applicable communication constraint not being satisfied, UE 120 may perform joint DMRS estimation. For example, UE 120 may perform joint DMRS estimation across a plurality of PDSCHs. In some aspects, based at least in part on the applicable communication constraint not being satisfied, UE 120 may perform soft combining (e.g., of LLRs). In some aspects, based at least in part on the applicable communication constraint not being satisfied for a particular PDSCH of a plurality of PDSCHs signaled by the one or more DCI messages, UE 120 may determine to drop the particular PDSCH (e.g., not receive or not process the particular PDSCH).

In some aspects, based at least in part on receiving the one or more PDSCHs, UE 120 may decode the one or more PDSCHs as described above. Additionally, or alternatively, UE 120 may process the one or more PDSCHs, provide a response associated with the one or more PDSCHs, and/or the like.

As indicated above, FIG. 7 is provided as an example. Other examples may differ from what is described with respect to FIG. 7.

FIG. 8 is a diagram illustrating an example process 800 performed, for example, by a UE, in accordance with various aspects of the present disclosure. Example process 800 is an example where a UE (e.g., UE 120) performs multiple link communication constraint.

As shown in FIG. 8, in some aspects, process 800 may include receiving, when operating in a multiple link communication system, one or more downlink control information (DCI) messages scheduling one or more downlink communications (block 810). For example, the UE (e.g., using antenna 252, DEMOD 254, MIMO detector 256, receive processor 258, controller/processor 280, and/or the like) may receive, when operating in a multiple link communication system, one or more DCI messages scheduling one or more downlink communications, as described in more detail above.

As shown in FIG. 8, in some aspects, process 800 may include determining, based at least in part on the one or more DCI messages, whether a communication constraint is satisfied for the one or more downlink communications (block 820). For example, the UE (e.g., using controller/processor 280 and/or the like) may determine, based at least in part on the one or more DCI messages, whether a communication constraint is satisfied for the one or more downlink communications, as described in more detail above.

As shown in FIG. 8, in some aspects, process 800 may include determining a communication configuration for the one or more downlink communications based at least in part on whether the communication constraint is satisfied (block 830). For example, the UE (e.g., using controller/processor 280 and/or the like) may determine a communication configuration for the one or more downlink communications based at least in part on whether the communication constraint is satisfied, as described in more detail above.

As shown in FIG. 8, in some aspects, process 800 may include receiving, in the multiple link communication system, the one or more downlink communications based at least in part on the communication configuration (block 840). For example, the UE (e.g., using antenna 252, DEMOD 254, MIMO detector 256, receive processor 258, controller/processor 280, and/or the like) may receive, in the multiple link communication system, the one or more downlink communications based at least in part on the communication configuration, as described in more detail above.

Process 800 may include additional aspects, such as any single aspect or any combination of aspects described below and/or in connection with one or more other processes described elsewhere herein.

With respect to process 800, in a first aspect, the communication constraint is based at least in part on a quantity of the one or more downlink communications.

With respect to process 800, in a second aspect, alone or in combination with the first aspect, the one or more downlink communications include at least one of: one or more physical downlink control channels, one or more physical downlink shared channels, or one or more reference signals.

With respect to process 800, in a third aspect, alone or in combination with one or more of the first and second aspects, the communication constraint is satisfied based at least in part on time allocations for the one or more downlink communications overlapping and a common demodulation reference signal pattern being used for the one or more downlink communications.

With respect to process 800, in a fourth aspect, alone or in combination with one or more of the first through third aspects, the communication constraint is based at least in part on whether the user equipment is to soft combine log-likelihood ratios of the downlink communications.

With respect to process 800, in a fifth aspect, alone or in combination with one or more of the first through fourth aspects, the communication constraint is based at least in part on whether the downlink communications include a common transport block.

With respect to process 800, in a sixth aspect, alone or in combination with one or more of the first through fifth aspects, the UE is configured to determine a demodulation reference signal DMRS pattern parameter or a frequency domain resource assignment parameter in connection with the one or more DCI messages.

With respect to process 800, in a seventh aspect, alone or in combination with one or more of the first through sixth aspects, process 800 includes providing information identifying the communication constraint to cause the communication constraint to be enforced by a transmission/reception point (TRP) of the multiple link communication system.

With respect to process 800, in an eighth aspect, alone or in combination with one or more of the first through seventh aspects, the user equipment is configured to determine the communication constraint based at least in part on a channel quantity parameter or a channel quality parameter.

With respect to process 800, in a ninth aspect, alone or in combination with one or more of the first through eighth aspects, the communication constraint is based at least in part on a parameter relating to at least one of a quantity of layers scheduled for the user equipment, a carrier aggregation mode of the user equipment, a demodulation reference signal processing configuration, a demodulation reference signal bundling configuration, a soft combining configuration, or a downlink communication timing configuration.

With respect to process 800, in a tenth aspect, alone or in combination with one or more of the first through ninth aspects, the user equipment is configured to receive the one or more downlink communications in accordance with a common allocation based at least in part on the communication configuration.

With respect to process 800, in an eleventh aspect, alone or in combination with one or more of the first through tenth aspects, a plurality of allocations associated with the one or more downlink communications are associated with a common component carrier, and the user equipment is configured to use a common physical resource group (PRG) grid for the plurality of allocations based at least in part on the communication configuration.

With respect to process 800, in a twelfth aspect, alone or in combination with one or more of the first through eleventh aspects, the DCI includes a PRG bit and the user equipment is configured to support dynamic PRG and to receive the one or more downlink communications using a common PRG based at least in part on the communication configuration.

With respect to process 800, in a thirteenth aspect, alone or in combination with one or more of the first through twelfth aspects, the user equipment is not configured to support a dynamic PRG, and the user equipment is configured to use a common PRG for a demodulation reference signal (DMRS) of the one or more downlink communications based at least in part on the communication configuration.

With respect to process 800, in a fourteenth aspect, alone or in combination with one or more of the first through thirteenth aspects, the common PRG is associated with a downlink communication, of the one or more downlink communications, associated with a particular base station.

With respect to process 800, in a fifteenth aspect, alone or in combination with one or more of the first through fourteenth aspects, the user equipment is configured to determine the common PRG based at least in part on a stored value for the common PRG.

With respect to process 800, in a sixteenth aspect, alone or in combination with one or more of the first through fifteenth aspects, the user equipment is configured to determine the common PRG based at least in part on a smallest PRG indicator value of a set of PRG indicator values.

With respect to process 800, in a seventeenth aspect, alone or in combination with one or more of the first through sixteenth aspects, a DCI message, of the one or more DCI messages, identifies a particular virtual resource block (VRB)/physical resource block (PRB) mapping value, and the user equipment is configured to receive the one or more downlink communications using the particular VRB/PRB mapping value and based at least in part on the communication configuration.

With respect to process 800, in an eighteenth aspect, alone or in combination with one or more of the first through seventeenth aspects, the user equipment is configured to receive the one or more downlink communications using a fully overlapping time domain allocation or a fully disjoint time domain allocation based at least in part on the communication configuration.

With respect to process 800, in a nineteenth aspect, alone or in combination with one or more of the first through eighteenth aspects, the user equipment is configured to use a common stored DMRS pattern for all of the one or more downlink communications based at least in part on the communication configuration.

With respect to process 800, in a twentieth aspect, alone or in combination with one or more of the first through nineteenth aspects, the user equipment is configured to use a DMRS pattern associated with a largest quantity of DMRS symbols, relative to one or more other candidate DMRS patterns, for all of the one or more downlink communications based at least in part on the communication configuration.

With respect to process 800, in a twenty-first aspect, alone or in combination with one or more of the first through twentieth aspects, the user equipment is configured to use a DMRS pattern associated with a particular base station for all of the one or more downlink communications based at least in part on the communication configuration.

With respect to process 800, in a twenty-second aspect, alone or in combination with one or more of the first through twenty-first aspects, the user equipment is configured to use a DMRS pattern of the downlink communication channel scheduled by a particular core resource set for all of the one or more downlink communications based at least in part on the communication configuration.

With respect to process 800, in a twenty-third aspect, alone or in combination with one or more of the first through twenty-second aspects, the multiple link communication system is a multiple beam communication system or a multiple transmission/reception point (multi-TRP) communication system.

With respect to process 800, in a twenty-fourth aspect, alone or in combination with one or more of the first through twenty-third aspects, the one or more DCI messages associated with the one or more downlink communications may be associated with one or more bandwidth parts of one or more component carriers.

With respect to process 800, in a twenty-fifth aspect, alone or in combination with one or more of the first through twenty-fourth aspects, the communication constraint is not satisfied and the user equipment is configured to determine, as the communication configuration to decode a subset of the one or more downlink communications, demodulate the subset of the one or more downlink communications, process the one or more downlink communications based at least in part on a stored communication parameter that is different from an indicated communication parameter of the one or more DCI messages, or process the one or more downlink communications based at least in part on a first indicated communication parameter of a first downlink communication, of the one or more downlink communications, that is different from a second indicated communication parameter, of a second downlink communication of the one or more downlink communications.

With respect to process 800, in a twenty-sixth aspect, alone or in combination with one or more of the first through twenty-fifth aspects, the user equipment is configured to provide information identifying a user equipment capability to identify the communication constraint and a communication scenario under which the communication constraint is to be satisfied, and the user equipment is configured to indicate that the communication constraint is to be enforced for the one or more DCI messages.

Although FIG. 8 shows example blocks of process 800, With respect to process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
    transmitting, in a multiple link communication system, information identifying a communication constraint associated with the user equipment being capable of performing soft combining;
    receiving, based at least in part on transmitting the information identifying the communication constraint, one or more downlink control information (DCI) messages scheduling a plurality of downlink communications;
    determining a communication configuration, for the plurality of downlink communications, that satisfies the communication constraint; and
    receiving, in the multiple link communication system, one or more downlink communications, of the plurality of downlink communications, using a fully overlapping time domain allocation or a fully disjoint time domain allocation based at least in part on the communication configuration,
    wherein a demodulation reference signal (DMRS) pattern of a downlink communication channel is used for all of the plurality of downlink communications based at least in part on the communication configuration.

2. The method of claim 1, wherein the communication constraint is based at least in part on a quantity of the plurality of downlink communications.

3. The method of claim 1, wherein the plurality of downlink communications includes at least one of:
one or more physical downlink control channel communications,
one or more physical downlink shared channel communications, or
one or more reference signals.

4. The method of claim 1, wherein the DMRS pattern is a common DMRS pattern being used for the plurality of downlink communications.

5. The method of claim 1, wherein the communication constraint is based at least in part on whether the user equipment is capable of performing soft-combining of log-likelihood ratios of the one or more downlink communications.

6. The method of claim 1, wherein a DMRS pattern parameter or a frequency domain resource assignment parameter is determined in connection with the one or more DCI messages.

7. The method of claim 1, wherein the communication constraint is determined based at least in part on a channel quantity parameter or a channel quality parameter.

8. The method of claim 1, wherein the communication constraint is based at least in part on a parameter relating to the user equipment being capable of performing soft combining.

9. The method of claim 1, wherein the one or more downlink communications are received in accordance with a common allocation based at least in part on the communication configuration.

10. The method of claim 1, wherein a plurality of allocations, associated with the plurality of downlink communications and including the fully overlapping time domain allocation or the fully disjoint time domain allocation, are associated with a common component carrier, and
wherein a common physical resource group grid is used for the plurality of allocations based at least in part on the communication configuration.

11. The method of claim 1, wherein a DCI message, of the one or more DCI messages, identifies a particular virtual resource block (VRB)/physical resource block (PRB) mapping value, and
wherein the one or more downlink communications are received using the particular VRB/PRB mapping value and based at least in part on the communication configuration.

12. The method of claim 1, wherein the DMRS pattern associated with a largest quantity of DMRS symbols, relative to one or more other candidate DMRS patterns, is used for all of the plurality of downlink communications based at least in part on the communication configuration.

13. The method of claim 1, wherein the multiple link communication system is a multiple beam communication system or a multiple transmission/reception point communication system.

14. The method of claim 1, wherein the one or more DCI messages are associated with one or more bandwidth parts of one or more component carriers.

15. The method of claim 1, wherein the communication constraint is not satisfied and the user equipment is configured to determine, as the communication configuration, to:
decode a subset of the one or more downlink communications,
demodulate the subset of the one or more downlink communications,
process the one or more downlink communications based at least in part on a stored communication parameter that is different from an indicated communication parameter of the one or more DCI messages, or
process the one or more downlink communications based at least in part on a first indicated communication parameter of a first downlink communication, of the one or more downlink communications, that is different from a second indicated communication parameter, of a second downlink communication of the one or more downlink communications.

16. The method of claim 1, wherein information identifying a user equipment capability is provided to identify the communication constraint and a communication scenario under which the communication constraint is to be satisfied, and
wherein the communication constraint is indicated to be enforced for the one or more DCI messages.

17. A user equipment for wireless communication, comprising:
a memory; and one or more processors coupled to the memory, the one or more processors configured to:
transmit, in a multiple link communication system, information identifying a communication constraint associated with the user equipment being capable of performing soft combining;
receive, based at least in part on transmitting the information identifying the communication constraint, one or more downlink control information (DCI) messages scheduling a plurality of downlink communications;
determine a communication configuration, for the plurality of downlink communications, that satisfies the communication constraint; and
receive, in the multiple link communication system, one or more downlink communications, of the plurality of downlink communications, using a fully overlapping time domain allocation or a fully disjoint time domain allocation based at least in part on the communication configuration,
wherein a demodulation reference signal (DMRS) pattern of a downlink communication channel is used for all of the plurality of downlink communications based at least in part on the communication configuration.

18. A non-transitory computer-readable medium storing one or more instructions for wireless communication, the one or more instructions comprising:
one or more instructions that, when executed by one or more processors of a user equipment, cause the one or more processors to:
transmit, in a multiple link communication system, information identifying a communication constraint associated with the user equipment being capable of performing soft combining;
receive, based at least in part on transmitting the information identifying the communication constraint, one or more downlink control information (DCI) messages scheduling a plurality of downlink communications;
determine a communication configuration, for the plurality of downlink communications, that satisfies the communication constraint; and
receive, in the multiple link communication system, one or more downlink communications, of the plurality of downlink communications, using a fully overlapping time domain allocation or a fully disjoint time domain allocation based at least in part on the communication configuration, wherein a demodulation reference signal (DMRS) pattern of a downlink communication channel is used for all of the plurality of downlink communications based at least in part on the communication configuration.

19. An apparatus for wireless communication, comprising:
means for transmitting, in a multiple link communication system, information identifying a communication constraint associated with the apparatus being capable of performing soft combining;
means for receiving, based at least in part on transmitting the information identifying the communication constraint, one or more downlink control information (DCI) messages scheduling a plurality of downlink communications;
means for determining a communication configuration, for the plurality of downlink communications, that satisfies the communication constraint; and
means for receiving, in the multiple link communication system, one or more downlink communications, of the one or more downlink communications, using a fully overlapping time domain allocation or a fully disjoint time domain allocation based at least in part on the communication configuration,
wherein a demodulation reference signal (DMRS) pattern of a downlink communication channel is used for all of the plurality of downlink communications based at least in part on the communication configuration.

20. The method of claim 1, wherein the transmitting of the information identifying the communication constraint is to cause the communication constraint to be enforced by a transmission/reception point of the multiple link communication system.

21. The method of claim 1, wherein the DMRS pattern is used for all of the one or more downlink communications associated with a largest quantity of DMRS symbols, relative to one or more other candidate DMRS patterns, is used for all of the one or more downlink communications based at least in part on the communication configuration.

22. The method of claim 1, wherein receiving the one or more DCI messages comprises:
receiving a single DCI message scheduling the plurality of downlink communications.

23. The user equipment of claim 17, wherein the one or more processors, to receive the one or more DCI messages, are configured to:
receive a single DCI message scheduling the plurality of downlink communications.

24. The user equipment of claim 17, wherein the plurality of downlink communications includes at least one of:
one or more physical downlink control channel communications,
one or more physical downlink shared channel communications, or
one or more reference signals.

25. The user equipment of claim 17, wherein the DMRS pattern is a common DMRS pattern being used for the plurality of downlink communications.

26. The non-transitory computer readable medium of claim 18, wherein the one or more processors, to receive the one or more DCI messages, are configured to:
receive a single DCI message scheduling the plurality of downlink communications.

27. The non-transitory computer-readable medium of claim 18, wherein the plurality of downlink communications includes at least one of:
one or more physical downlink control channel communications,
one or more physical downlink shared channel communications, or
one or more reference signals.

28. The non-transitory computer-readable medium of claim 18, wherein the DMRS pattern is a common DMRS pattern being used for the plurality of downlink communications.

29. The apparatus of claim 19, wherein the means for receiving the one or more DCI messages comprises:
means for receiving a single DCI message scheduling the plurality of downlink communications.

30. The apparatus of claim 19, wherein the plurality of downlink communications includes at least one of:
one or more physical downlink control channel communications,
one or more physical downlink shared channel communications, or
one or more reference signals.

* * * * *